United States Patent
Okuyama et al.

(10) Patent No.: US 6,835,681 B2
(45) Date of Patent: Dec. 28, 2004

(54) DIELECTRIC CERAMIC COMPOSITION AND DIELECTRIC DEVICE

(75) Inventors: Kojiro Okuyama, Nara (JP); Hiroshi Kagata, Osaka (JP); Junichi Kato, Osaka (JP); Hiroyuki Hase, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/027,620

(22) Filed: Dec. 19, 2001

(65) Prior Publication Data

US 2002/0111261 A1 Aug. 15, 2002

(30) Foreign Application Priority Data

Dec. 20, 2000 (JP) .................................. 2000-387742

(51) Int. Cl.⁷ .......................... C03C 14/00; C04B 35/46
(52) U.S. Cl. .................... 501/32; 501/136; 333/219.1
(58) Field of Search ........................ 501/32, 134, 136, 501/135; 333/219.1

(56) References Cited

U.S. PATENT DOCUMENTS

| | | | |
|---|---|---|---|
| 4,987,108 A | | 1/1991 | Takagi et al. ............... 501/138 |
| 5,340,784 A | | 8/1994 | Katoh et al. ................ 501/136 |
| 5,356,843 A | * | 10/1994 | Okuyama et al. ........... 501/134 |
| 5,378,663 A | | 1/1995 | Abe et al. ..................... 501/32 |
| 5,470,808 A | * | 11/1995 | Okuyama et al. ........... 501/134 |
| 5,843,860 A | * | 12/1998 | Kim et al. .................. 501/134 |
| 6,077,802 A | * | 6/2000 | Hahn et al. ................. 501/134 |

FOREIGN PATENT DOCUMENTS

| | | | |
|---|---|---|---|
| EP | 0 539 151 | | 4/1993 |
| EP | 0 584 140 | | 3/1994 |
| EP | 0 717 018 | | 6/1996 |
| JP | 4-357616 | * | 12/1992 |
| JP | 6-92727 | | 4/1994 |
| JP | 6-295619 | | 10/1994 |
| JP | 8-157259 | * | 6/1996 |
| JP | 2002-53373 | * | 2/2002 |

* cited by examiner

Primary Examiner—Karl Group
(74) Attorney, Agent, or Firm—Merchant & Gould P.C.

(57) ABSTRACT

A dielectric ceramic composition containing a first component and a second component (25 to 80 wt %) is used. The first component is a complex oxide represented by Formula: $xZrO_2\text{-}yTiO_2\text{-}zL_{(1+u)/3}M_{(2-u)/3}O_2$ (L is at least one element selected from the group consisting of Mg, Zn, Co, and Mn, and M is at least one element selected from the group consisting of Nb and Tb. x, y, z, and u are numerical values represented by $x+y+z=1$, $0.10 \leq x \leq 0.60$, $0.20 \leq y \leq 0.60$, $0.01 \leq z \leq 0.70$, $0 \leq u \leq 1.90$). The second component is a glass composition containing an oxide of at least one element selected from the group consisting of Si, B, Al, Ba, Ca, Sr, Zn, Ti, La, and Nd.

8 Claims, 2 Drawing Sheets

DIELECTRIC CERAMIC COMPOSITION AND DIELECTRIC DEVICE

BACKGROUND OF THE INVENTION

1. Field of the Invention

The present invention relates to a dielectric ceramic composition and a dielectric device. The dielectric ceramic composition of the present invention particularly is suitable, for example, as a material for a dielectric device used in a high-frequency region such as a microwave band and a millimeter wave band.

2. Description of the Related Art

In recent years, dielectric ceramics have been used widely for dielectric resonators and dielectric filters used in a microwave region and a millimeter wave region. Dielectrics used for such purposes have been required to have a high no-load Q-value (Qu-value), a large dielectric constant ($\in r$), and a small and arbitrarily variable temperature coefficient ($\tau f$) of a resonance frequency. However, as the dielectric constant of a dielectric ceramic is larger, a dielectric device becomes smaller. Therefore, with an increase in frequency of a communication system, there is an increasing demand for a dielectric ceramic composition with a relatively small dielectric constant in view of improving processing precision and reducing a conductor loss of a dielectric device.

On the other hand, by simultaneously sintering a dielectric ceramic composition and a conductor (e.g., Ag) having a high conductivity, an inexpensive dielectric device can be obtained having a low conductor loss. In order to realize this, there is a demand for a dielectric ceramic composition that can be sintered at 950° C. or lower.

As a dielectric ceramic composition with a small dielectric constant, $MgTiO_3$—$CaTiO_3$ ceramics (see JP 6(1994)-92727 A), $Al_2O_3$ ceramics, and a ceramic composition obtained by adding a glass composition to an $Al_2O_3$ ceramic conventionally are known.

Although the $MgTiO_3$—$CaTiO_3$ ceramic has relatively satisfactory dielectric characteristics, it cannot be sintered at 950° C. or lower. The $Al_2O_3$ ceramic has a high Qu-value, and a small dielectric constant ($\in r$) (i.e., about 10); however, it has a large temperature coefficient ($\tau f$) of a resonance frequency, and cannot be sintered at 950° C. or lower. The ceramic composition in which a glass composition is added to the $Al_2O_3$ ceramic has too large temperature coefficient ($\tau f$) of a resonance frequency.

SUMMARY OF THE INVENTION

Therefore, with the foregoing in mind, it is an object of the present invention to provide a dielectric ceramic composition that has a high no-load Q (Qu)-value, a dielectric constant ($\in r$) of about 10 to 30, and a small absolute value of a temperature coefficient ($\tau f$) of a resonance frequency, and can be sintered at 950° C. or lower. It is another object of the present invention to provide an inexpensive dielectric device with a low loss, suitable for use in a high frequency region such as a microwave band and a millimeter band.

In order to achieve the above-mentioned object, a dielectric ceramic composition of the present invention includes a first component and a second component, wherein a content of the second component is in a range of 25 to 80 wt % (weight %). The first component is a complex oxide represented by Formula: $xZrO_2\text{-}yTiO_2\text{-}zL_{(1+u)/3}M_{(2-u)/3}O_2$, wherein L is at least one element selected from the group consisting of Mg, Zn, Co, and Mn, M is at least one element selected from the group consisting of Nb and Ta, and x, y, z, and u are values represented by x+y+z=1, $0.10 \leq x \leq 0.60$, $0.20 \leq y \leq 0.60$, $0.01 \leq z \leq 0.70$, and $0 \leq u \leq 1.90$. The second component is a glass composition containing an oxide of at least one element selected from the group consisting of Si, B, Al, Ba, Ca, Sr, Zn, Ti, La, and Nd.

According to the above-mentioned configuration, a dielectric ceramic composition having a high Qu-value, $\in r$ of about 10 to 30, and $\tau f$ with a small absolute value can be obtained. Furthermore, the above-mentioned dielectric ceramic composition can be sintered at a temperature of 950° C. or lower. It is preferable that u satisfies 0<u. Furthermore, the second component preferably is a glass composition containing Si and B.

In the dielectric ceramic composition of the present invention, a preferable example of the second component is a glass composition containing 30 to 60 wt % of $SiO_2$, 2 to 30 wt % of $B_2O_3$, 2 to 10 wt % of $Al_2O_3$, and 20 to 50 wt % of QO. Another preferable example of the second component is a glass composition containing 30 to 60 wt % of $SiO_2$, 2 to 10 wt % of $B_2O_3$, 2 to 10 wt % of $Al_2O_3$, 20 to 50 wt % of QO, and 5 to 15 wt % of $La_2O_3$. Still another preferable example of the second component is a glass composition containing 40 to 60 wt % of $SiO_2$, 2 to 10 wt % of $B_2O_3$, 2 to 10 wt % of $Al_2O_3$, 20 to 50 wt % of QO, and 1 to 5 wt % of ZnO. Still another preferable example of the second component is a glass composition containing 15 to 30 wt % of $SiO_2$, 5 to 20 wt % of BaO, 5 to 15 wt % of RO, 10 to 25 wt % of ZnO, 10 to 30 wt % of $TiO_2$, and 10 to 30 wt % of $T_2O_3$. In the above-mentioned second component, Q is at least one element selected from the group consisting of Ba and Ca, R is at least one element selected from the group consisting of Ca and Sr, and T is at least one element selected from the group consisting of La and Nd.

In the dielectric ceramic composition of the present invention, it is preferable that the first component contains, as a main phase, a $ZrTiO_4$ phase in which at least one element selected from the group consisting of Mg, Zn, Co, and Mn and at least one element selected from the group consisting of Nb and Ta are substituted in a solid phase. In the present specification, the term "main phase" refers to a component present in a content of 50 wt % or more. It also is preferable that $0.5 \leq a/b \leq 1.9$ (a is a total of mole fractions of at least one element selected from the group consisting of Mg, Zn, Co, and Mn substituted in a solid phase of $ZrTiO_4$, and b is a total of mole fractions of at least one element selected from the group consisting of Nb and Ta substituted in a solid phase of $ZrTiO_4$) is satisfied in the first component.

A dielectric device of the present invention includes a dielectric ceramic and a conductor formed so as to be in contact with the dielectric ceramic, wherein the dielectric ceramic includes a dielectric ceramic composition of the present invention, and the conductor contains, as a main component, at least one element selected from the group consisting of Ag and Pd. This dielectric device is suitable for use in a high-frequency region such as a microwave band and a millimeter wave band and has a low loss. Furthermore, the dielectric device can be produced at a low cost because the dielectric ceramic and the conductor can be sintered simultaneously.

These and other advantages of the present invention will become apparent to those skilled in the art upon reading and understanding the following detailed description with reference to the accompanying figures.

DESCRIPTION OF THE PREFERRED EMBODIMENTS

Figure 1:
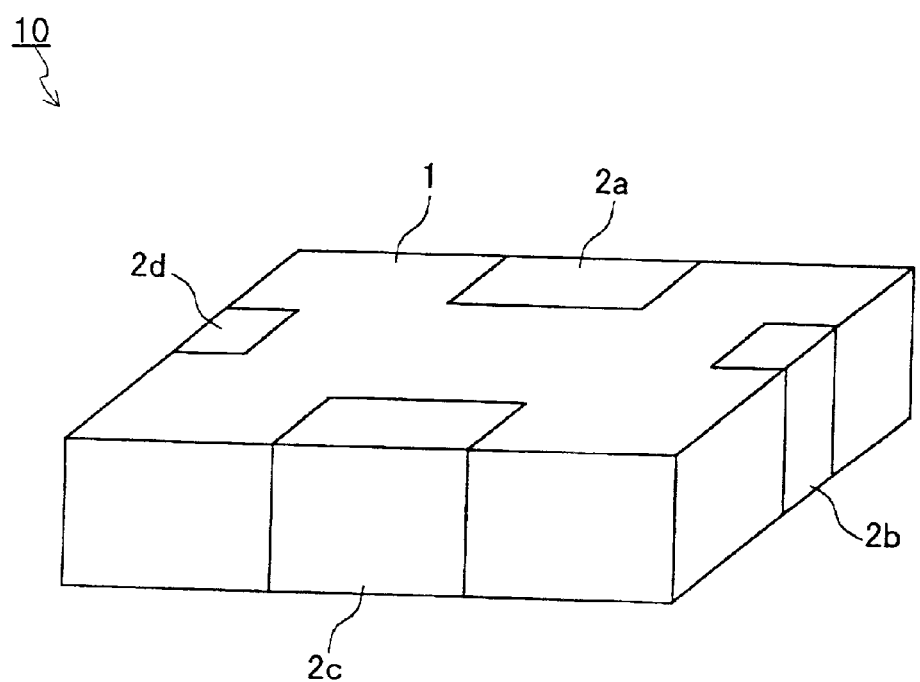
FIG. 1 is a perspective view showing an example of a dielectric device of the present invention.

Hereinafter, the present invention will be described by way of preferred embodiments.

Embodiment 1

In Embodiment 1, a dielectric ceramic composition of the present invention will be described. The dielectric ceramic composition of the present invention contains a first component and a second component, and the content of the second component is in a range of 25 to 80 wt %. The dielectric ceramic composition of the present invention may be composed of only the first and second components. When the content of the second component is not in the above-mentioned range, the dielectric ceramic composition cannot be sintered at 950° C. or lower or does not have a high Qu-value. The content of the second component preferably is in a range of 35 to 75 wt %.

The second component is a glass composition containing an oxide of at least one element selected from the group consisting of Si, B, Al, Ba, Ca, Sr, Zn, Ti, La, and Nd. As specific examples of the second component, there are the following four preferable examples.

(1) A glass composition composed of 30 to 60 wt % of $SiO_2$, 2 to 30 wt % of $B_2O_3$, 2 to 10 wt % of $Al_2O_3$, and 20 to 50 wt % of QO.

(2) A glass composition composed of 30 to 60 wt % of $SiO_2$, 2 to 10 wt % of $B_2O_3$, 2 to 10 wt % of $Al_2O_3$, 20 to 50 wt % of QO, and 5 to 15 wt % of $La_2O_3$.

(3) A glass composition composed of 40 to 60 wt % of $SiO_2$, 2 to 10 wt % of $B_2O_3$, 2 to 10 wt % of $Al_2O_3$, 20 to 50 wt % of QO, and 1 to 5 wt % of ZnO.

(4) A glass composition composed of 15 to 30 wt % of $SiO_2$, 5 to 20 wt % of BaO, 5 to 15 wt % of RO, 10 to 25 wt % of ZnO, 10 to 30 wt % of $TiO_2$, and 10 to 30 wt % of $T_2O_3$.

Herein, as noted above, Q is at least one element selected from the group consisting of Ba and Ca. R is at least one element selected from the group consisting of Ca and Sr. T is at least one element selected from the group consisting of La and Nd. When the second component is not in the above-mentioned range, the resultant glass composition may not be vitrified or may have too high hygroscopicity.

The above-mentioned first component is a complex oxide represented by the Formula: $xZrO_2$-$yTiO_2$-$zL_{(1+u)/3}M_{(2-u)/3}O_2$. Herein, L is at least one element selected from the group consisting of Mg, Zn, Co, and Mn. M is at least one element selected from the group consisting of Nb and Ta. Furthermore, x, y, z, and u are values satisfying "x+y+z=1", "$0.10 \leq x \leq 0.60$", "$0.20 \leq y \leq 0.60$", "$0.01 \leq z \leq 0.70$", and "$0 \leq u \leq 1.90$". Furthermore, x, y, and z are equal to mole fractions of $ZrO_2$, $TiO_2$, and $L_{(2+u)/3}M_{(1-u)/3}O_2$, respectively. When x, y, z, and u are not in the above-mentioned range, a high Qu-value cannot be obtained. It particularly is preferable that x, y, z, and u satisfy "$0.300 \leq x \leq 0.400$", "$0.400 \leq y \leq 0.560$", "$0.100 \leq z \leq 0.300$", and "$0.01 \leq u \leq 0.20$".

It is preferable that the first component contains, as a main phase, a $ZrTiO_4$ phase in which the above-mentioned element L and the above-mentioned element M are substituted in a solid phase. In other words, it is preferable that the first component contains, as its main component, $ZrTiO_4$ in which the above-mentioned element L and the above-mentioned element M are substituted in a solid phase. In the present specification, the "main component" refers to a component having a content of 50 wt % or more. $ZrTiO_4$ (i.e., a solid solution of $ZrTiO_4$, the element L, and the element M) in which the element L and the element M are dissolved in a solid phase slightly differs in crystal structure from $ZrTiO_4$ crystal. In the case where the first component contains a solid solution of $ZrTiO_4$ as its main component, it is preferable that the ratio of mole fraction a of the element L dissolved in a solid phase and the mole fraction b of the element M dissolved in a solid phase is $0.5 \leq a/b \leq 1.9$ (more preferably, $0.508 \leq a/b \leq 0.667$).

Hereinafter, an example of a method for producing a dielectric ceramic composition of the present invention will be described. First, powder of a starting material of a dielectric ceramic is prepared and mixed. The starting material of the dielectric ceramic is not particularly limited, and an oxide, a carbonate, a hydroxide, a chloride, alkoxide, and the like of each component element can be used.

As a method for mixing material powder, a wet mixing method can be used for mixing powder with water or an organic solvent in a ball mill. It also may be possible to use a dry mixing method for mixing with a mixer or the like, mixing in a ball mill without using a solvent, etc. Furthermore, in accordance with a starting material, an alkoxide method and a coprecipitation. method also can be used. Among these mixing methods, a method for mixing in a ball mill with a solvent is preferable, since the process is relatively uncomplicated and a homogeneous mixture easily can be obtained. In order to enhance dispersibility of powder, a dispersant may be used or pH may be adjusted.

Next, the mixture thus obtained is sintered provisionally. The conditions for provisional sintering of the mixture are varied depending upon the composition. However, the mixture generally may be heated at about 700° C. to 1300° C. for about 1 to 8 hours. In the case where vitrification is required, a mixture melted by heating only needs to be cooled rapidly. Rapid cooling can be conducted by dropping a melted mixture into water or onto a metal plate.

Next, the provisionally sintered body or glass compound is ground to obtain powder. Grinding of the provisionally sintered body or glass compound can be conducted by using a ball mill, a high-speed rotary grinder, a medium stirring mill, an air current grinder, or the like.

Next, a binder is added to the powder thus obtained, followed by molding. The powder generally is molded by press molding. Although not particularly limited, the pressure for press molding preferably is about 50 to 200 MPa. There is no particular limit to a binder as long as it can be used for molding ceramics. For example, a polyvinyl alcohol type binder, a polyvinyl butyral type binder, acrylic resin type binder, a wax type binder, or the like can be used. Although there is no particular limit to the use amount of a binder, it is preferable that the content of a binder (solid content) generally is about 0.05 to 1 wt % based on the total weight.

Then, by sintering the molded material, the dielectric ceramic composed of the composition of the present invention is obtained. The conditions for sintering are not particularly limited. However, it is preferable that a binder is removed by heating at 400° C. to 700° C. for about 1 to 24 hours, and thereafter, the material is sintered at 800° C. to 950° C. for about 2 to 100 hours.

Embodiment 2

In Embodiment 2, a dielectric device of the present invention will be described. The dielectric device of the present invention includes a dielectric ceramic made of the dielectric ceramic composition of Embodiment 1 and a conductor (for example, two or more electrode patterns) formed inside and/or on the surface of the dielectric ceramic so as to come into contact with the dielectric ceramic. The conductor can be formed of metal containing at least one element selected from Ag and Pd as its main component. For example, the conductor can be formed of an Ag simple substance or a Pd simple substance.

Examples of the dielectric device of the present invention include a dielectric filter, a dielectric resonator, a dielectric common unit, and a dielectric coupler. Among them, an example of a dielectric filter will be described in Example 2.

EXAMPLES

Hereinafter, the present invention will be described in detail by way of illustrative examples. It should be noted that the present invention is not limited to the following examples.

Example 1

In Example 1, an example of the dielectric ceramic composition of the present invention will be described.

As starting materials of the first component, $ZrO_2$, $TiO_2$, MgO, ZnO, CoO, $Nb_2O_5$, $Ta_2O_5$, and $Mn_3O_4$ were used. These materials were measured so as to obtain a predetermined composition, and wet-mixed with ethanol using a ball mill. The volume ratio between the powder and ethanol was set at about 2:3. The mixture was taken out of the ball mill, and dried at 120° C. Thereafter, the mixture was sintered provisionally in the air at 1250° C. for 2 hours, whereby powder of dielectric crystal (first component) was obtained.

As starting materials of the second component, $SiO_2$, $B_2O_3$, $A_2O_3$, BaO, CaO, SrO, ZnO, $TiO_2$, $La_2O_3$, $Nd_2O_3$ were used. These materials were measured so as to obtain a predetermined composition, and wet-mixed with ethanol using a ball mill. The volume ratio between the powder and ethanol was set at about 2:3. The mixture was taken out of the ball mill, and dried at 120° C. The dried mixture was placed in a crucible made of platinum, and melted in the air at 1300° C. The melted mixture was cooled rapidly by being dropped into water to obtain glass. The glass thus obtained was ground by the same method as that for mixing and dried to obtain glass powder (second component).

Next, the dielectric powder (first component) and the glass powder (second component) were mixed in a predetermined ratio, and the mixture was wet-ground in a ball mill with ethanol, whereby a slurry was obtained. The slurry was taken out of the ball mill and dried to obtain a powder. A polyvinyl alcohol solution (concentration: 6%) was added as a binder to the powder in an amount of 8 wt %, thereby homogenizing the powder. The mixture thus obtained was subjected to sizing through a 32-mesh sieve. The sized powder was molded into a disk (diameter: 13 mm, thickness: about 6 mm) under a molding pressure of 130 MPa, using a mold and a hydraulic press machine. The molding was placed in a basin made of high-purity magnesia, and the molding was kept in the air at 500° C. for 4 hours, thereby removing the binder. Thereafter, the molding was held and sintered in the air at 800° C. to 950° C. for 4 hours. Thus, a dielectric ceramic made of the dielectric ceramic composition of the present invention was obtained.

The dielectric ceramic thus obtained was evaluated for electrical characteristics. More specifically, the dielectric ceramic was measured by Hakki and Coleman's resonator method using a network analyzer to obtain a Qf-value (product of a Qu-value and a resonance frequency), and a dielectric constant ($\in r$). The temperature coefficient ($\tau f$) of the resonance frequency was obtained in a range of −25° C. to 85° C. The resonance frequency was in a range of 6 to 13 GHz.

Table 1 shows the composition and state of the second component thus produced, and Table 2 shows the composition of the dielectric ceramic composition thus obtained. Furthermore, Table 3 shows electrical characteristics of the dielectric ceramic. In Tables 2 and 3, samples with a mark "*", were comparative examples.

TABLE 1

| Mark | Glass Composition (wt %) | | | | | | | | | | State of glass |
|------|------|------|------|------|------|------|------|------|------|------|------|
|      | $SiO_2$ | $B_2O_3$ | $Al_2O_3$ | BaO | CaO | ZnO | $La_2O_3$ | SrO | $TiO_2$ | $Nd_2O_3$ | |
| e | 78 | 1 | 1 | 5 | 5 | 8 | 2 | | | | Not vitrified |
| f | 10 | 40 | 15 | | | | 35 | | | | Hygroscopic |
| g | 15 | 15 | | 60 | | 10 | | | | | Not vitrified |
| h | 30 | 30 | 10 | 15 | 15 | | | | | | Satisfactory |
| i | 60 | 2 | 2 | 36 | | | | | | | Satisfactory |
| j | 40 | 5 | 5 | 25 | 25 | | | | | | Satisfactory |
| k | 50 | 20 | 10 | 20 | | | | | | | Satisfactory |
| l | 60 | 10 | 2 | 20 | | | 8 | | | | Satisfactory |
| m | 30 | 10 | 5 | 25 | 25 | | 5 | | | | Satisfactory |
| n | 43 | 2 | 10 | 30 | | | 15 | | | | Satisfactory |
| p | 44 | 5 | 6 | 35 | | | 10 | | | | Satisfactory |
| q | 60 | 10 | 2 | 13 | 10 | 5 | | | | | Satisfactory |
| r | 40 | 2 | 7 | 35 | 15 | 1 | | | | | Satisfactory |
| s | 55 | 10 | 10 | 20 | | 5 | | | | | Satisfactory |
| t | 50 | 5 | 5 | 25 | 13 | 2 | | | | | Satisfactory |
| v | 15 | | | 20 | 10 | 10 | 15 | 5 | 10 | 15 | Satisfactory |
| w | 30 | | | 5 | 3 | 25 | 5 | 2 | 25 | 5 | Satisfactory |
| A | 20 | | | 15 | 7 | 10 | 5 | 3 | 30 | 10 | Satisfactory |
| B | 18 | | | 17 | 5 | 15 | | 5 | 22 | 18 | Satisfactory |
| C | 22 | | | 13 | 3 | 15 | | 7 | 18 | 22 | Satisfactory |
| D | 19 | | | 16 | 8 | 13 | | 4 | 20 | 20 | Satisfactory |

TABLE 2

| Sample No. | First component L | M | x | y | z | u | Second component Sample | Content (wt %) |
|---|---|---|---|---|---|---|---|---|
| *1 | Mg | Nb | 0.400 | 0.150 | 0.450 | 0 | p | 40 |
| 2 | Mg | Nb | 0.200 | 0.200 | 0.600 | 0 | p | 40 |
| 3 | Mg | Nb | 0.450 | 0.200 | 0.350 | 0 | p | 40 |
| 4 | Mg | Nb | 0.200 | 0.600 | 0.200 | 0 | p | 40 |
| 5 | Zn | Nb | 0.200 | 0.600 | 0.200 | 0 | p | 40 |
| *6 | Mg | Nb | 0.150 | 0.700 | 0.150 | 0 | p | 40 |
| 7 | Mg | Nb | 0.100 | 0.200 | 0.700 | 0 | p | 40 |
| *8 | | | 0.550 | 0.450 | 0 | 0 | p | 40 |
| 9 | Mg | Nb | 0.490 | 0.500 | 0.010 | 0 | p | 40 |
| 10 | Zn | Nb | 0.490 | 0.500 | 0.010 | 0 | p | 40 |
| 11 | Mg | Nb | 0.350 | 0.450 | 0.200 | 0 | p | 40 |
| 12 | $Mg_{9/10} Mn_{1/10}$ | Nb | 0.340 | 0.520 | 0.140 | 0 | p | 40 |
| 13 | $Zn_{9/10} Mn_{1/10}$ | Nb | 0.340 | 0.520 | 0.140 | 0 | p | 40 |
| 14 | Mn | Nb | 0.340 | 0.520 | 0.140 | 0 | p | 40 |
| 15 | $Mg_{9/10} Mn_{1/10}$ | Ta | 0.340 | 0.520 | 0.140 | 0 | p | 40 |
| 16 | $Mg_{9/10} Mn_{1/10}$ | $Nb_{1/2} Ta_{1/2}$ | 0.340 | 0.520 | 0.140 | 0 | p | 40 |
| 17 | $Mg_{9/10} Mn_{1/10}$ | Nb | 0.340 | 0.520 | 0.140 | 0.1 | p | 40 |
| 18 | $Mg_{9/10} Mn_{1/10}$ | Nb | 0.340 | 0.520 | 0.140 | 0.96 | p | 40 |
| 19 | $Mg_{9/10} Mn_{1/10}$ | Nb | 0.340 | 0.520 | 0.140 | 1.9 | p | 40 |
| *20 | $Mg_{9/10} Mn_{1/10}$ | Nb | 0.340 | 0.520 | 0.140 | 1.95 | p | 40 |
| *21 | Mg | Nb | 0.650 | 0.200 | 0.150 | 0 | p | 40 |
| 22 | Mg | Nb | 0.600 | 0.300 | 0.100 | 0 | p | 40 |
| *23 | Mg | Nb | 0.050 | 0.500 | 0.450 | 0 | p | 40 |
| *24 | $Mg_{9/10} Mn_{1/10}$ | Nb | 0.360 | 0.540 | 0.100 | 0.1 | p | 15 |
| 25 | $Mg_{9/10} Mn_{1/10}$ | Nb | 0.360 | 0.540 | 0.100 | 0.1 | p | 25 |
| 26 | $Mg_{9/10} Mn_{1/10}$ | Nb | 0.360 | 0.540 | 0.100 | 0.1 | p | 35 |
| 27 | $Mg_{9/10} Mn_{1/10}$ | Nb | 0.360 | 0.540 | 0.100 | 0.1 | p | 43 |
| 28 | $Mg_{9/10} Mn_{1/10}$ | Nb | 0.360 | 0.540 | 0.100 | 0.1 | p | 60 |
| 29 | $Mg_{9/10} Mn_{1/10}$ | Nb | 0.360 | 0.540 | 0.100 | 0.1 | p | 70 |
| *30 | $Mg_{9/10} Mn_{1/10}$ | Nb | 0.360 | 0.540 | 0.100 | 0.1 | p | 90 |
| 31 | $Mg_{9/10} Mn_{1/10}$ | Nb | 0.360 | 0.540 | 0.100 | 0.1 | h | 43 |
| 32 | $Mg_{9/10} Mn_{1/10}$ | Nb | 0.360 | 0.540 | 0.100 | 0.1 | i | 43 |
| 33 | $Mg_{9/10} Mn_{1/10}$ | Nb | 0.360 | 0.540 | 0.100 | 0.1 | j | 43 |
| 34 | $Mg_{9/10} Mn_{1/10}$ | Nb | 0.360 | 0.540 | 0.100 | 0.1 | k | 35 |
| 35 | $Mg_{9/10} Mn_{1/10}$ | Nb | 0.360 | 0.540 | 0.100 | 0.1 | k | 43 |
| 36 | $Mg_{9/10} Mn_{1/10}$ | Nb | 0.360 | 0.540 | 0.100 | 0.1 | k | 60 |
| 37 | $Mg_{9/10} Mn_{1/10}$ | Nb | 0.360 | 0.540 | 0.100 | 0.1 | l | 43 |
| 38 | $Mg_{9/10} Mn_{1/10}$ | Nb | 0.360 | 0.540 | 0.100 | 0.1 | m | 43 |
| 39 | $Mg_{9/10} Mn_{1/10}$ | Nb | 0.360 | 0.540 | 0.100 | 0.1 | n | 43 |
| 40 | $Mg_{9/10} Mn_{1/10}$ | Nb | 0.360 | 0.540 | 0.100 | 0.1 | q | 43 |
| 41 | $Mg_{9/10} Mn_{1/10}$ | Nb | 0.360 | 0.540 | 0.100 | 0.1 | r | 43 |
| 42 | $Mg_{9/10} Mn_{1/10}$ | Nb | 0.360 | 0.540 | 0.100 | 0.1 | s | 43 |
| 43 | $Mg_{9/10} Mn_{1/10}$ | Nb | 0.360 | 0.540 | 0.100 | 0.1 | t | 35 |
| 44 | $Mg_{9/10} Mn_{1/10}$ | Nb | 0.360 | 0.540 | 0.100 | 0.1 | t | 43 |
| 45 | $Mg_{9/10} Mn_{1/10}$ | Nb | 0.360 | 0.540 | 0.100 | 0.1 | t | 60 |
| 46 | $Co_{9/10} Mn_{1/10}$ | $Nb_{1/2} Ta_{1/2}$ | 0.340 | 0.520 | 0.140 | 0 | p | 40 |
| 47 | $Co_{9/10} Mn_{1/10}$ | Nb | 0.340 | 0.520 | 0.140 | 0.1 | p | 40 |
| 48 | $Co_{9/10} Mn_{1/10}$ | Nb | 0.340 | 0.520 | 0.140 | 0.96 | p | 40 |
| 49 | $Mg_{9/10} Mn_{1/10}$ | Nb | 0.340 | 0.520 | 0.140 | 0.1 | v | 70 |
| 50 | $Mg_{9/10} Mn_{1/10}$ | Nb | 0.340 | 0.520 | 0.140 | 0.1 | w | 70 |
| 51 | $Mg_{9/10} Mn_{1/10}$ | Nb | 0.340 | 0.520 | 0.140 | 0.1 | A | 70 |
| 52 | $Mg_{9/10} Mn_{1/10}$ | Nb | 0.340 | 0.520 | 0.140 | 0.1 | B | 70 |
| 53 | $Mg_{9/10} Mn_{1/10}$ | Nb | 0.340 | 0.520 | 0.140 | 0.1 | C | 75 |
| 54 | $Mg_{9/10} Mn_{1/10}$ | Nb | 0.340 | 0.520 | 0.140 | 0.1 | D | 75 |
| 55 | $Mg_{9/10} Mn_{1/10}$ | Nb | 0.340 | 0.520 | 0.140 | 0.1 | D | 80 |

In Table 2, x, y, z, and u represent numerical values when the first component is represented by the following composition formula: $xZrO_2\text{-}yTiO_2\text{—}zL_{(1+u)/3}M_{(2-u)/3}O_2$ (L and M are elements as described above).

In the case where a plurality of elements are represented as elements L and M as in $Mg_{9/10}$ and $Mn_{1/10}$, 9/10 and 1/10 represent a mole fraction of each element.

TABLE 3

| Sample No. | Sintering Temperature (° C.) | Qf (GHz) | εr | τf (ppm/° C.) |
|---|---|---|---|---|
| *1 | 950 | Nonmeasurable | | |
| 2 | 950 | 4000 | 12.3 | −40 |
| 3 | 950 | 4500 | 16.2 | 12 |
| 4 | 900 | 4200 | 19.8 | 38 |
| 5 | 850 | 4300 | 18.5 | 29 |
| *6 | 900 | 950 | 32.2 | 67 |
| 7 | 950 | 4900 | 10.8 | −38 |
| *8 | 950 | 800 | 18.8 | 78 |
| 9 | 900 | 4000 | 18.5 | 37 |
| 10 | 900 | 4200 | 16.9 | 23 |
| 11 | 900 | 6000 | 17.2 | 16 |
| 12 | 900 | 9500 | 18.0 | 5 |
| 13 | 850 | 8600 | 16.9 | −3 |
| 14 | 850 | 6200 | 15.2 | 25 |
| 15 | 900 | 9900 | 16.7 | 1 |
| 16 | 900 | 11000 | 17.8 | 2 |
| 17 | 900 | 13600 | 17.5 | −2 |
| 18 | 900 | 10900 | 15.3 | −12 |
| 19 | 950 | 6800 | 14.1 | −25 |
| *20 | 950 | 650 | 11.3 | −56 |
| *21 | 950 | Nonmeasurable | | |
| 22 | 950 | 4200 | 14.6 | 36 |
| *23 | 950 | 360 | 15.9 | 54 |
| *24 | 950 | Nonmeasurable | | |
| 25 | 950 | 6000 | 12.3 | 29 |
| 26 | 950 | 12000 | 16.4 | 12 |
| 27 | 900 | 14200 | 17.8 | 2 |
| 28 | 850 | 12300 | 15.0 | −8 |
| 29 | 800 | 8500 | 12.4 | 18 |

TABLE 3-continued

| Sample No. | Sintering Temperature (° C.) | Qf (GHz) | ∈r | τf (ppm/° C.) |
|---|---|---|---|---|
| *30 | 800 | 670 | 9.8 | 32 |
| 31 | 950 | 6800 | 16.5 | 25 |
| 32 | 950 | 6000 | 15.8 | 13 |
| 33 | 950 | 6300 | 16.1 | 10 |
| 34 | 950 | 8100 | 15.8 | 21 |
| 35 | 900 | 10600 | 18.4 | 7 |
| 36 | 850 | 7400 | 13.4 | −9 |
| 37 | 900 | 9500 | 16.9 | 16 |
| 38 | 900 | 8400 | 16.3 | 7 |
| 39 | 900 | 7500 | 16.5 | 12 |
| 40 | 950 | 6300 | 15.2 | 29 |
| 41 | 950 | 7400 | 16.0 | 16 |
| 42 | 950 | 8500 | 16.3 | 9 |
| 43 | 950 | 9500 | 15.9 | 22 |
| 44 | 900 | 11200 | 17.5 | 6 |
| 45 | 850 | 10000 | 15.9 | −8 |
| 46 | 900 | 9600 | 17.5 | 8 |
| 47 | 900 | 12400 | 17.8 | 2 |
| 48 | 900 | 10000 | 16.0 | −3 |
| 49 | 900 | 4000 | 29.8 | 18 |
| 50 | 900 | 4200 | 19.6 | −16 |
| 51 | 900 | 4500 | 24.9 | −8 |
| 52 | 900 | 4800 | 26.4 | −5 |
| 53 | 850 | 4700 | 27.0 | −11 |
| 54 | 850 | 4100 | 26.5 | −9 |
| 55 | 850 | 4050 | 25.8 | −7 |

As shown in Table 3, in the samples other than Comparative Examples, a high Qf-value (4000 or more), ∈r of about 10 to 30, and τf having a small absolute value (40 ppm/° C. or less) were obtained. Furthermore, such high electrical characteristics were achieved at a low sintering temperature of 950° C. or lower. On the other hand, the samples of Comparative Examples with a mark "*" could not be sintered, so that it was impossible to measure the electrical characteristics thereof Alternatively, even though the samples of Comparative Examples with a mark "*" could not be sintered, at least one of the above-mentioned characteristics (Qf-value, ∈r, τf) was not in the above-mentioned preferable range. In the samples of Comparative Examples, particularly, a Qf-value was decreased remarkably.

The samples other than Comparative Examples were subjected to powder x-ray diffraction measurement to confirm a $ZrTiO_4$ phase. Furthermore, the fracture plane and ground plane of a dielectric ceramic containing a $ZrTiO_4$ phase as a main phase were subjected to composition analysis using a local X-ray diffraction apparatus. As a result, it was confirmed that Zr, Ti, an element L, and an element M were present in a single crystal grain. Furthermore, the composition ratio thereof was substantially the same in each crystal grain constituting the main phase. It also was confirmed that all the elements L and M mixed as the first component were present in a single crystal grain. Furthermore, in a dielectric ceramic in which each of Zr, Ti, and elements L and M was present in a crystal grain constituting the main phase, it was confirmed that a lattice constant became larger, compared with that of a $ZrTiO_4$ ceramic obtained under the same sintering conditions. It was confirmed from these results that both the elements L and M were substituted in a solid phase in the $ZrTiO_4$ phase.

In the above-mentioned dielectric ceramic, the mole fraction of the elements L and M dissolved in a solid phase in the $ZrTiO_4$ phase were quantified using a local X-ray diffraction apparatus. As a result, it was confirmed that dielectric ceramics (Sample Nos. 11–18, 25–29, and 31–48) with a value of a/b in a range of 0.5 to 1.9 exhibited a higher Qf-value (6000 or more).

Example 2

In Example 2, an example of the production of a dielectric filter using a dielectric ceramic composition similar to that of Sample Nos. 16, 27, or 44 of Example 1 will be described.

Figure 2:
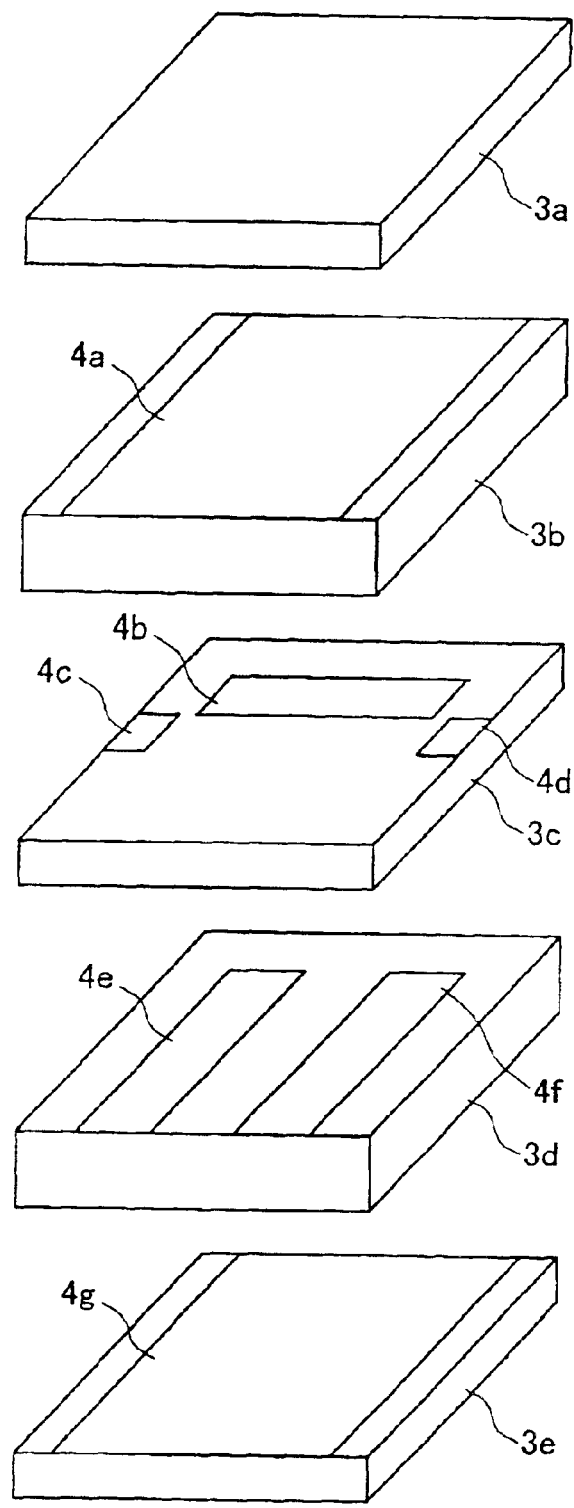
FIG. 2 is a perspective view showing an exemplary internal electrode structure of the dielectric device of the present invention.

In Example 2, a stacked dielectric filter 10 as shown in FIG. 1 was produced. The dielectric filter 10 includes a dielectric ceramic 1 and electrodes formed inside and on the surface of the dielectric ceramic 1. A method for producing the dielectric filter 10 will be described with reference to FIG. 2. First, sheets 3a, 3b, 3c, 3d, and 3e, which have not been sintered and were made of a dielectric ceramic composition, were formed, and internal electrodes 4a, 4b, 4c, 4d, 4e, 4f, and 4g were formed on the surface of these sheets. A dielectric ceramic composition similar to that of Sample Nos. 16, 27, or 44 of Example 1 was used. The internal electrodes were formed of an Ag paste.

Next, the sheets 3a to 3e were stacked on top of each other, and the stack thus obtained was coated with an Ag paste, whereby terminal electrodes 2a, 2b, 2c, and 2d were formed. Finally, the stack and the electrodes were sintered simultaneously. Sintering was conducted under the same conditions as those in Example 1.

The dielectric filter thus obtained was evaluated for performance. An insertion loss was ½ of that of a conventional dielectric filter using a composition with $Al_2O_3$ added to glass. Furthermore, the temperature coefficient at a central frequency (about 5 GHz) was about 1/10 of that of the conventional dielectric filter. It was confirmed from these results that the dielectric device of Example 2 can be used as a dielectric device with a low loss, suitable for use in a high-frequency region such as a microwave band and a millimeter wave band. As described above, the stacked dielectric device of the present invention can be produced by sintering the dielectric ceramic composition and the electrode material such as an Ag paste simultaneously, so that it can be produced with a very high efficiency.

As described above, according to the present invention, a dielectric ceramic composition can be obtained, which has a high Qu-value, ∈r of about 10 to 30, and τf with a small absolute value, and can be sintered at a temperature of 950° C. or lower. Furthermore, according to the present invention, an inexpensive dielectric device with a low loss suitable for use in a high-frequency region such as a microwave band and a millimeter wave band can be obtained.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A dielectric ceramic composition comprising a first component and a second component,
wherein a content of the second component is in a range of 25 to 80 wt %,
the first component is a complex oxide represented by Formula:

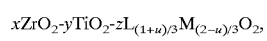

$xZrO_2\text{-}yTiO_2\text{-}zL_{(1+u)/3}M_{(2-u)/3}O_2,$ wherein L is at least one element selected from the group consisting of Mg, Zn, Co, and Mn, M is at least one element selected from the group consisting of Nb and Ta, and x, y, z, and u are values represented by x+y+z=1,
0.10≦x≦0.60,
0.20≦y≦0.60,
0.01≦z≦0.70, and
0≦u≦1.90, and the second component is a glass composition containing 30 to 60 wt % of $SiO_2$, 2 to 30 wt % of $B_2O_3$, 2 to 10 wt % of $Al_2O_3$, and 20 to 50 wt % of QO.

wherein O is at one element selected from the group consisting of Ba and Ca.

2. A dielectric ceramic composition according to claim 1, wherein the second component is a glass composition containing 30 to 60 wt % of $SiO_2$, 2 to 10 wt % of $B_2O_3$, 2 to 10 wt % of $Al_2O_3$, 20 to 50 wt % of QO, and 5 to 15 wt % of $La_2O_3$, wherein Q is at least one element selected from the group consisting of Ba and Ca.

3. A dielectric ceramic composition according to claim 1, wherein the second component is a glass composition containing 40 to 60 wt % of $SiO_2$, 2 to 10 wt % of $B_2O_3$, 2 to 10 wt % of $Al_2O_3$, 20 to 50 wt % of QO, and 1 to 5 wt % of ZnO, wherein Q is at least one element selected from the group consisting of Ba and Ca.

4. A dielectric ceramic composition according to claim 1, wherein the first component comprises, as a main phase, a $ZrTiO_4$ phase in which at least one element selected from the group consisting of Mg, Zn, Co, and Mn and at least one element selected from the group consisting of Nb and Ta are substituted in a solid phase.

5. A dielectric ceramic composition according to claim 4, wherein 0.5≦a/b≦1.9 is satisfied in the first component, wherein a is a total of mole fractions of at least one element selected from the group consisting of Mg, Zn, Co, and Mn substituted in a solid phase of $ZrTiO_4$, and b is a total of mole fractions of at least one element selected from the group consisting of Nb and Ta substituted in a solid phase of $ZrTiO_4$.

6. A dielectric device comprising a dielectric ceramic and a conductor formed so as to be in contact with the dielectric ceramic, wherein the dielectric ceramic comprises a dielectric ceramic composition of claim 1, and the conductor contains, as a main component, at least one element selected from the group consisting of Ag and Pd.

7. A dielectric ceramic composition comprising a first component and a second component, wherein a content of the second component is in a range of 25 to 80 wt %, the first component is a complex oxide represented by Formula:

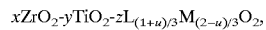

$xZrO_2\text{-}yTiO_2\text{-}zL_{(1+u)/3}M_{(2-u)/3}O_2,$ wherein L is at least one element selected from the group consisting of Mg, Zn, Co, and Mn, M is at least one element selected from the group consisting of Nb and Ta, and x, y, z, and u are values represented by x+y+Z=1,
0.10≦x≦0.60,
0.20≦y≦0.60,
0.01≦z≦0.70, and
0≦u≦1.90, and the second component is a glass composition containing 15 to 30 wt % of $SiO_2$, 5 to 20 wt % of BaO, 5 to 15 wt % of RO, 10 to 25 wt % of ZnO, 10 to 30 wt % of $TiO_2$, and 10 to 30 wt % of $T_2O_3$, wherein R is at least one element selected from the group consisting of Ca and Sr, and T is at least on element selected from the group consisting of La and Nd.

8. A dielectric device comprising a dielectric ceramic and a conductor formed so as to be in contact with the dielectric ceramic, wherein the dielectric ceramic comprises a dielectric composition of claim 7, and the conductor contains, as a main component, at least one element selected from the group consisting of Ag and Pd.

* * * * *

UNITED STATES PATENT AND TRADEMARK OFFICE
CERTIFICATE OF CORRECTION

PATENT NO. : 6,835,681 B2
DATED : December 28, 2004
INVENTOR(S) : Okuyama et al.

It is certified that error appears in the above-identified patent and that said Letters Patent is hereby corrected as shown below:

<u>Column 11,</u>
Line 10, "wherein O is at one element" should read -- wherein Q is at least one element --.

<u>Column 12,</u>
Line 21, "x+y+Z" should read -- x+y+z --.

Signed and Sealed this

Tenth Day of January, 2006

JON W. DUDAS
*Director of the United States Patent and Trademark Office*